(12) United States Patent
Dailey et al.

(10) Patent No.: US 7,270,304 B2
(45) Date of Patent: Sep. 18, 2007

(54) ISOLATING POSITIONING BOOM FOR INSTRUMENT PLATFORM

(75) Inventors: Dean R. Dailey, Torrance, CA (US); Charles F. Lillie, Playa del Rey, CA (US); Martin Flannery, Santa Monica, CA (US); Jonathan W. Arenberg, Santa Monica, CA (US); Allen J. Bronowicki, Laguna Niguel, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/964,849

(22) Filed: Oct. 13, 2004

(65) Prior Publication Data

US 2006/0076459 A1 Apr. 13, 2006

(51) Int. Cl.
*B64G 1/00* (2006.01)

(52) U.S. Cl. .................................................. 244/172.6

(58) Field of Classification Search ............. 244/171.1, 244/171.7, 172.6, 173.2, 171.2, 171.8, 172.7, 244/173.3

See application file for complete search history.

(56) References Cited

U.S. PATENT DOCUMENTS

| | | | | |
|---|---|---|---|---|
| 3,464,116 A | * | 9/1969 | Kissell | .......................... 33/268 |
| 4,508,297 A | * | 4/1985 | Mouilhayrat et al. | .... 244/172.7 |
| 5,348,124 A | * | 9/1994 | Harper | ........................ 188/378 |
| 6,285,338 B1 | * | 9/2001 | Bai et al. | ..................... 343/882 |
| 6,450,453 B1 | * | 9/2002 | Roulo | ....................... 244/172.6 |
| 6,462,718 B1 | * | 10/2002 | Ehrenberg et al. | .......... 343/880 |
| 6,481,671 B1 | * | 11/2002 | Blair | ........................... 244/168 |
| 6,531,990 B2 | * | 3/2003 | Verkerk | ....................... 343/882 |
| 6,590,685 B1 | * | 7/2003 | Mendenhall et al. | ....... 398/121 |
| 6,937,188 B1 | * | 8/2005 | Saunders et al. | ........... 342/359 |
| 2002/0167702 A1 | * | 11/2002 | Badesha et al. | ............ 359/172 |
| 2005/0030604 A1 | * | 2/2005 | Moore | ........................ 359/198 |
| 2005/0048915 A1 | * | 3/2005 | Westall | ...................... 455/13.3 |
| 2006/0001956 A1 | * | 1/2006 | Baun et al. | .................. 359/430 |

OTHER PUBLICATIONS

"James Webb Space Telescope." Wikipedia, The Free Encyclopedia. Mar. 26, 2006, 10:21 UTC. Mar. 30, 2006, 12:09 <http://en.wikipedia.org/w/index.php?title=James_Webb_Space_Telescope&oldid=45547475>. ☐☐.*
"Momentum wheel." Wikipedia, The Free Encyclopedia. Mar. 26, 2006, 11:27 UTC. Sep. 22, 2002, 12:09 <http://en.wikipedia.org/w/index.php?title=Momentum_wheel&oldid=45552062>.*
"Piezoelectricity." Wikipedia, The Free Encyclopedia. Mar. 21, 2006, 12:50 UTC. Sep. 30, 2004, 12:10 <http://en.wikipedia.org/w/index.php?title=Piezoelectricity&oldid=44807810>.*

* cited by examiner

*Primary Examiner*—Teri Pham Luu
*Assistant Examiner*—Stephen Holzen
(74) *Attorney, Agent, or Firm*—Carmen B. Patti & Assoc., LLC

(57) ABSTRACT

A positioning boom disposed between a space-based observatory platform and its instrument payload provides thermal and dynamic isolation as well as fine pointing and momentum control. The inventive system isolates a sensitive payload from a warm, dynamically noisy spacecraft, which includes a sunshield. Isolation is required in terms of dynamics and heat flow, both in terms of the absolute level and its variance (thermal isolation). The present invention provides intrinsic control over momentum buildup (which is due to the separation of the center of pressure from the center of mass). The space-based platform also provides a view (field of regard) to at least half the sky (in the anti-sun direction).

20 Claims, 4 Drawing Sheets ical Field

The invention relates generally to a space-based observatory platform and in particular to an observatory platform in which a positioning boom disposed between the platform and its instrument payload provides thermal and dynamic isolation as well as fine pointing and momentum control.

BACKGROUND

In deploying an instrument platform for space-based observation, it is often required that the platform provide shielding from solar influence. This generally requires that a sun shield be included as part of the platform structure. The sensitive instrumentation in the instrument payload is susceptible to thermal effects and mechanical noise originating in the platform itself. In addition, it is frequently a requirement that the instrument payload be capable of a wide range of motion in order to aim the instrument as desired. Repositioning of the instrument payload can result in momentum buildup that must often be corrected at the cost of fuel or stored electric power.

Thus, a need exists for a space-based observatory platform with enhanced immunity to mechanical vibration and thermal effects, as well as fine pointing capability that does not increase the platform's susceptibility to momentum buildup.

SUMMARY

These needs and others are satisfied by the present invention, in which a positioning boom disposed between the platform and its instrument payload provides thermal and dynamic isolation as well as fine pointing and momentum control. The basic problem addressed by this invention is design of a system that isolates a sensitive payload from a warm, dynamically noisy spacecraft, which includes a sunshield. Isolation is required in terms of dynamics and heat flow, both in terms of the absolute level and its variance (thermal isolation). Secondly, it was desired that the design provide intrinsic control over momentum buildup (which is due to the separation of the center of pressure from the center of mass). The design also needs to provide a view (field of regard) to at least half the sky (in the anti-sun direction).

In one embodiment in accordance with the present invention, an improved space-based observatory platform, having an instrument payload and a sunshield, is provided. The improvement comprises a gimbaled positioning boom having a high length-to-width aspect ratio coupling the instrument payload to the observatory platform, wherein the boom has a relatively low natural frequency to minimize transmission of dynamic noise between the instrument payload and the observatory platform. In accordance with one form of the invention, the positioning boom is articulated to position the instrument payload center of gravity with respect to the sunshield center of solar pressure. The positioning boom may include a piezoelectric actuator at the point of articulation.

In one embodiment, the positioning boom further includes biaxial gimbal drives positioned proximate the instrument payload to provide rotation capability about both an elevation axis and an instrument boresight axis. The gimbal drives include piezoelectric stack-type actuators. In accordance with one aspect of the invention, the positioning boom length-to-width aspect ratio is in the range between 30 and 60.

In one form of the invention, the relatively long positioning boom positions the instrument payload at a distance from the sunshield for thermal decoupling. Furthermore, an attitude control system associated with the platform provides rotational motion control about the solar axis that extends from the sun, through the sunshield, to the instrument payload. The attitude control system may be based upon a reaction wheel arrangement. In one embodiment, the positioning boom is coupled to the observatory platform at two points of the observatory platform structure using relatively thin, highly damped bipod flexures to provide z-axis stability. The positioning boom may be layered with visco-elastic material to provide passive damping, or the positioning boom may include a plurality of piezoelectric patches disposed thereupon to provide active damping.

DESCRIPTION OF THE DRAWINGS

Features of exemplary implementations of the invention will become apparent from the description, the claims, and the accompanying drawings in which:

DETAILED DESCRIPTION

The present invention contemplates the use of a long, gimbaled, highly damped positioning boom to attach the payload to the spacecraft. The boom has a low natural frequency, which minimizes transmission of dynamic noise from the spacecraft, satisfying the first requirement. The boom can rapidly damp our vibrations induced by these disturbance sources. The boom is also a poor thermal conductor, since it is long with a small cross-section, and it moves the telescope away from the heat shield, lowering the radiative coupling between the payload and spacecraft. The reduced coupling between the sunshield and spacecraft significantly lowers the magnitude of thermal variations as the telescope's orientation is changed. In one embodiment, an active damping system is employed for the boom, with feedback control that operates at very low levels. The boom may have piezoelectric patches for active vibration damping and small pointing adjustments.

Furthermore, a gimbal at the end of the boom provides the ability to move the payload relative to the line connecting the sun and the center of solar radiation pressure, thus moving the center of mass of the entire satellite, relative to the center of pressure, in such a way as to minimize solar torques, momentum buildup, use of the reaction wheels, dynamic input, and consumption of fuel for momentum dumping. The positioning boom can also be made to offset the CG from the CP in a selected direction in order to reduce the momentum stored in the reaction wheels, eliminating the need to use propellant to dump momentum in most cases. The positioning boom is not in the launch load path and is not required to carry launch-induced stresses. Therefore, it can be made to meet all of these requirements.

In operation, one of the advantages of the present invention is that the boom can be designed to have very low frequency modes, effectively isolating the dynamic disturbances (from the spacecraft) from the instrument payload (such as a telescope). The positioning boom can also be made a "smart strut" that can be tuned in terms of its stiffness once on orbit (and bent slightly to make pointing adjustments). The decrease in the thermal input from the spacecraft and sunshield relaxes the requirements on the sunshield, and improves telescope performance.

Finally, the ability to move the center of mass of the entire satellite, relative to the center of pressure, allows for reduced reliance on the reaction wheels to counter solar torques, thus minimizing momentum buildup and reducing their dynamic input. This kind of momentum management allows for more efficient use of fuel needed to unload saturated momentum wheels. This allows for longer and more efficient missions, since thruster firings for momentum unloading are fewer and further between. Locating the telescope further away from the sunshield allows the telescope to look at more than half the sky, relaxing operational constraints and making for a higher performance mission.

Figure 1:
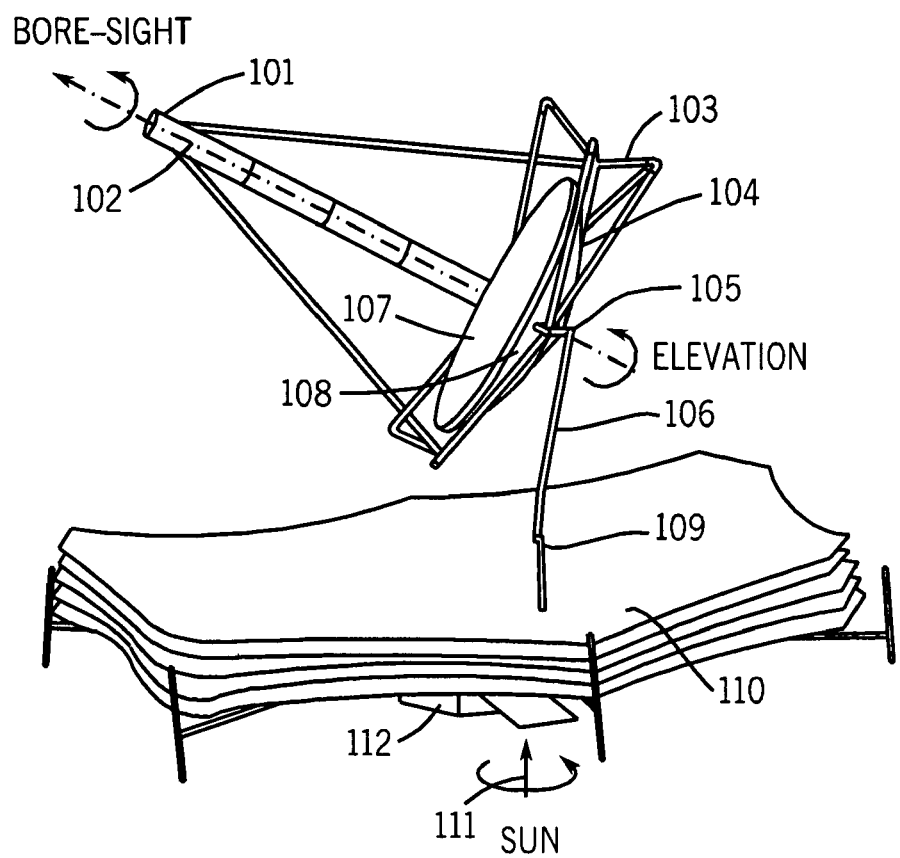
FIG. 1 is a perspective view of a space-based observatory platform with its instrument payload in a deployed configuration.

Turning to FIG. 1, a perspective view of a space-based platform is presented. One should consider that the illustrated configuration is consistent with the design strategies of the James Webb Space Telescope, or JWST, intended for deployment in 2011. The JWST will observe primarily the infrared light from faint and very distant objects. But all objects, including telescopes, also emit infrared light. To avoid swamping the very faint astronomical signals with radiation from the telescope, the telescope and its instruments must be very cold. Therefore, JWST has a large shield that blocks the light from the Sun, Earth, and Moon, which otherwise would heat up the telescope, and interfere with the observations.

In order for this concept to operate properly, JWST must be in an orbit where all three of these objects are in about the same direction. The most convenient point is the second Lagrange point (L2) of the Sun-Earth system, a semi-stable point in the gravitational potential around the Sun and Earth. Of course, these constraints also apply to instrument payloads that are not designed to collect optically-derived data. An optical payload is shown in the drawings merely for illustrative purposes.

FIG. 1 illustrates an optical payload with a bore-sight as indicated, having a primary focal point 102 within the tube structure, or tower housing, of the telescope. A secondary mirror 101 is disposed within the tower housing. The telescope has a gregorian-style off-axis paraboloid mirror 107 and a primary mirror reaction structure 108 that provides an adjustment base for fine tuning the primary mirror surface. Structurally, the instrument includes a support truss 103 and a tertiary optical component housing 104.

In one embodiment, the positioning boom 106 includes a telescoping mechanical damper with 50% to 100% Cr damping. This may be termed a jitter isolation damper. The damping of the boom may be active or passive. A piezoelectric actuator 109 at the point of articulation of the positioning boom 106 keeps the instrument payload center of gravity (CG) lined up with the solar pressure force center, as will be described more fully below in conjunction with FIGS. 2 and 3. As noted previously, the platform is a JWST-style system, having a JWST-type Bus/solar array/ com system 112. The entire platform may be rotated 360 degrees about the sun vector 111, using an attitude control system that may be based upon one or more reaction wheels, for example.

Figure 2:
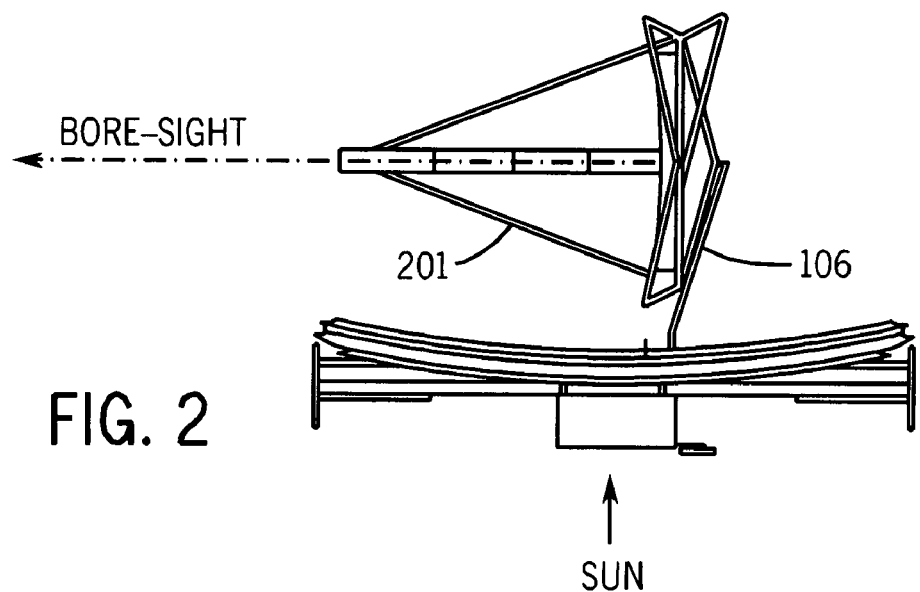
FIG. 2 is an elevational view of the instrument payload in a first configuration.
Figure 3:
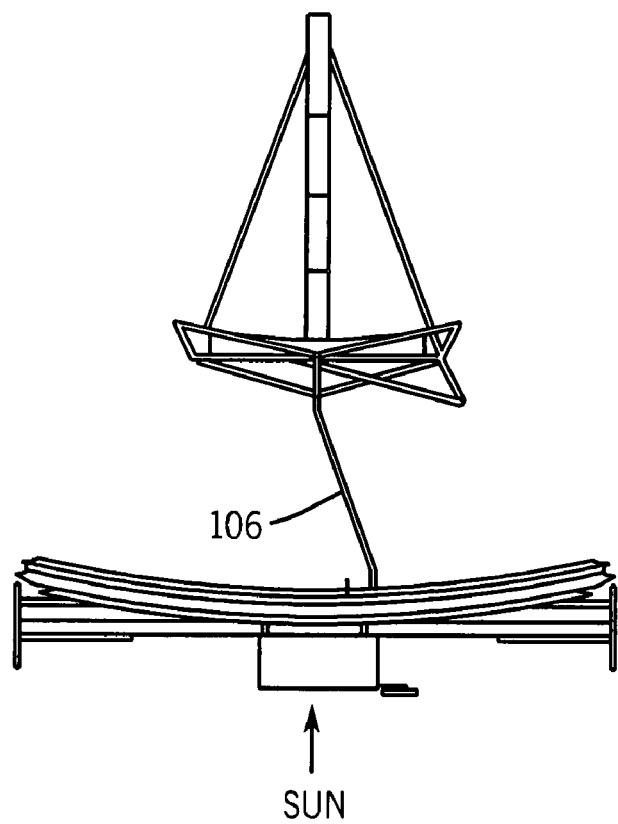
FIG. 3 is an elevational view of the instrument payload in a second configuration.

FIG. 2 shows the instrument payload 201 in a first orientation with the bore-sight aimed in a first desired direction. It should be noted that the positioning boom 106 is articulated in a first direction on order to maintain the instrument payload CG in alignment with the solar pressure force center. In FIG. 3, which shows the instrument payload in a second configuration, aiming of the bore-sight has been altered dramatically, and the positioning boom 106 is articulated in the opposite direction from the configuration shown in FIG. 2 to maintain the payload CG in its proper alignment. The positioning boom 106, which may be highly damped in one embodiment, serves multiple purposes. It positions the instrument payload CG with respect to the sunshield solar pressure CG, it serves as a very low frequency isolator (around 0.1 Hertz) in order to structurally decouple the instrument payload from the platform, and it positions the instrument payload at a distance away from the sunshield that is sufficient for thermal decoupling.

Figure 4:
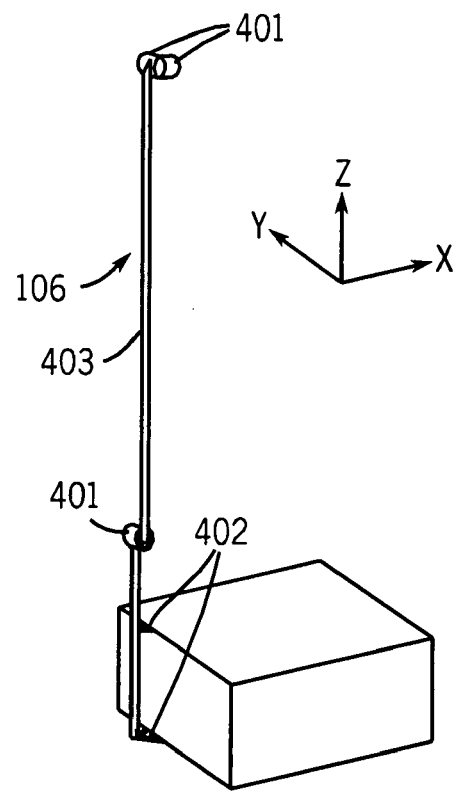
FIG. 4 illustrates mounting of the positioning boom to the platform.
Figure 5:
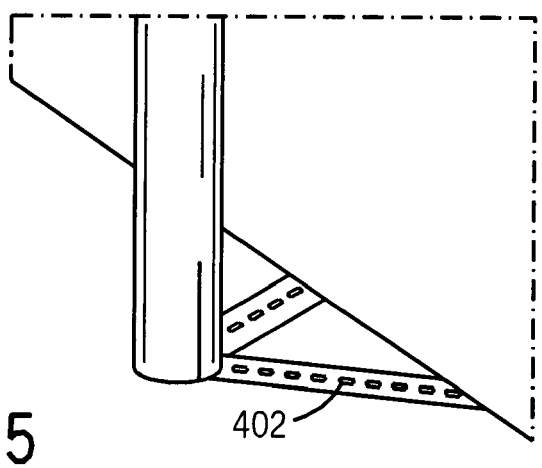
FIG. 5 is a close-up view of the mounting detail of FIG. 4.

FIGS. 4 and 5 depict the mounting arrangement utilized for the positioning boom 106 at the space platform end. The positioning boom 106, which is long, skinny, and highly-damped in one embodiment, provides flexibility in five degrees of freedom (with the exception of z-axis translation). The boom 106 is secured in position at the platform end by thin, highly damped bipod flexures 402 that are mounted at two points of the spacecraft structure in order to maximize z-direction flexibility.

For proper performance, the boom 106 must have a relatively large length-to-width aspect ratio, although the specific value is dependent upon a number of factors. Aspect ratios in the range from about 30 to 60 have been shown to work adequately. As a general matter, the boom 106 should be from 10 to 20 meters in length, with a width from about 150 mm to about 300 mm.

The boom 106 is constructed of graphite in one embodiment, such as a GFRP graphite material. Of course, other materials, such as titanium, for example, will also perform well, although metallic implementations may be undesirable where weight is a concern. For passive damping, a graphite boom would be layered with a visco-elastic material. Of course, a passively damped system must be kept warm for proper operation. This can be accomplished by surrounding the boom with a heated sock, for example, as known in the art.

Active damping is generally accomplished by disposing a plurality of piezoelectric actuators 403 along the length of the boom 106. Stresses along the boom 106 caused by flexing are transmitted to the proximate piezoelectric sensor, and a corresponding actuator is then used to provide a force acting on the boom in the opposite direction.

Figure 6:
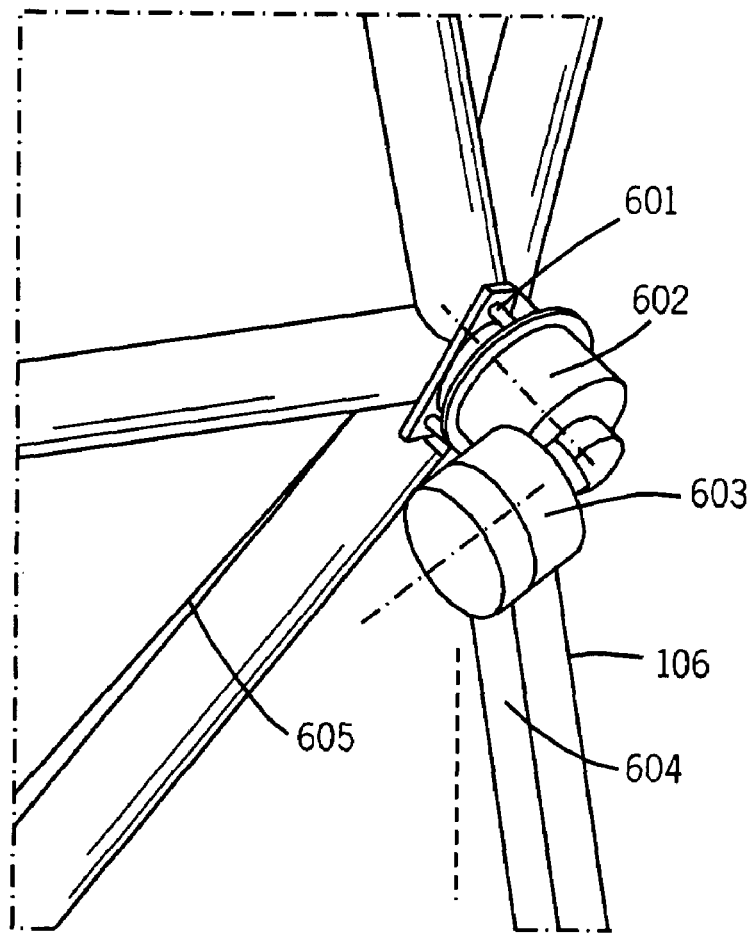
FIG. 6 depicts pointing actuators for the instrument payload.

FIG. 6 is illustrative of the pointing actuators for the instrument payload. Instrument payload fine-pointing actuators 601, with nano-radian resolution, are implemented using a tip/tilt plate (for azimuth and elevation of the instrument) using piezoelectric stacks. A bore sight axis rotation gimbal 602 yields a plus-or-minus 90 degree range of adjustment with 50 micro-radian resolution. A cable-wrap safely routes the harness across the joint, with cable wrap diameter sized according to wire count. The elevation axis gimbal 603 provides the same range of motion and resolution as the rotation gimbal 602, with low load level hysteresis less than one nano-radian. As noted previously, the positioning boom 106 is highly damped (50% to 100% Cr)

in one embodiment, and overall platform rotation about the azimuth axis 604 is provided by the platform's attitude control system (ACS). Rotation has a range of plus-or-minus 180 degrees with a 50 micro-radian resolution, and low load level hysteresis less than one nano-radian.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An improved space-based observatory platform having an instrument payload and a sunshield, wherein the improvement comprises:
   a gimbaled positioning boom having a length-to-width aspect ratio in a range between 30 and 60 to 1 coupling the instrument payload to the observatory platform, the boom having a natural frequency below a frequency of dynamic noise such that the boom minimizes transmission of the dynamic noise between the instrument payload and the observatory platform;
   the positioning boom further including a plurality of piezoelectric patches disposed thereupon to provide active damping, where stresses along the boom caused by flexing are transmitted to a proximate first piezoelectric sensor that is an element of one of the plurality of piezoelectric patches, and a corresponding in actuator that is an element of the same piezoelectric patch of which the first piezoelectric sensor is an element provides a force acting on the boom in a direction substantially opposite to a direction of flexing sensed by the first piezoelectric sensor;
   wherein the positioning boom is articulated to position the instrument payload center of gravity with respect to the sunshield center of solar pressure in at least five degrees of freedom to maintain a predetermined relationship between payload center of gravity and solar pressure force center, thus minimizing momentum buildup.

2. The improved space-based observatory platform of claim 1, wherein the positioning boom includes an articulation actuator at the point of articulation.

3. The improved space-based observatory platform of claim 2, wherein the articulation actuator is a piezoelectric actuator.

4. The improved space-based observatory platform of claim 1, wherein the positioning boom further includes biaxial gimbal drives positioned proximate the instrument payload to provide rotation capability about both an elevation axis and an instrument boresight axis.

5. The improved space-based observatory platform of claim 4, wherein the gimbal drives include piezoelectric stack actuators.

6. The improved space-based observatory platform of claim 1, wherein the positioning boom positions the instrument payload at a distance from the sunshield sufficient for thermal decoupling.

7. The improved space-based observatory platform of claim 1, wherein an attitude control system associated with the platform provides rotational motion control about the solar axis that extends from the sun, through the sunshield, to the instrument payload.

8. The improved space-based observatory platform of claim 7, wherein the attitude control system includes reaction wheels.

9. The improved space-based observatory platform of claim 1, wherein the positioning boom is coupled to the observatory platform at two points of the observatory platform structure using highly damped bipod flexures to provide z-axis stability.

10. The improved space-based observatory platform of claim 1, wherein the positioning boom is layered with visco-elastic material to provide passive damping.

11. A space-based observatory platform comprising:
    an instrument payload;
    a sunshield;
    a gimbaled positioning boom having a length-to-width aspect ratio in a range between 30 and 60 to 1 coupling the instrument payload to the observatory platform, the positioning boom articulated to position the instrument payload center of gravity with respect to the sunshield center of solar pressure in at least five degrees of freedom to maintain a predetermined relationship between payload center of gravity and solar pressure force center, thus minimizing momentum buildup, and further including biaxial gimbal drives positioned proximate the instrument payload to provide rotation capability about both an elevation axis and an instrument boresight axis;
    the boom having a natural frequency below a frequency of dynamic noise such that the boom minimizes transmission of dynamic noise between the instrument payload and the observatory platform;
    the positioning boom further including a plurality of piezoelectric patches disposed thereupon to provide active damping, where stresses along the boom caused by flexing are transmitted to a proximate first piezoelectric sensor that is an element of one of the plurality of piezoelectric patches, and a corresponding damping actuator that is an element of the same piezoelectric patch of which the first piezoelectric sensor is an element provides a force acting on the boom in a direction substantially opposite to a direction of flexing sensed by the first piezoelectric sensor.

12. The space-based observatory platform of claim 11, wherein the positioning boom includes an articulation actuator at the point of articulation.

13. The space-based observatory platform of claim 12, wherein the articulation actuator is a piezoelectric actuator.

14. The space-based observatory platform of claim 11, wherein the gimbal drives include piezoelectric stack actuators.

15. The space-based observatory platform of claim 11, wherein the positioning boom positions the instrument payload at a distance from the sunshield sufficient for thermal decoupling.

16. The space-based observatory platform of claim 11, wherein an attitude control system associated with the platform provides rotational motion control about the solar axis that extends from the sun, through the sunshield, to the instrument payload.

17. The space-based observatory platform of claim 16, wherein the attitude control system includes reaction wheels.

18. The space-based observatory platform of claim 11, wherein the positioning boom is coupled to the observatory platform at two points of the observatory platform structure using highly damped bipod flexures to provide z-axis stability.

19. The space-based observatory platform of claim 11, wherein the positioning boom is layered with visco-elastic material to provide passive damping.

20. A space-based observatory platform comprising:
an instrument payload;
a sunshield;
a gimbaled positioning boom having a length-to-width aspect ratio in a range between 30 and 60 to 1 coupling the instrument payload to the observatory platform, the positioning boom articulated to position the instrument payload center of gravity with respect to the sunshield center of solar pressure in at least five degrees of freedom to maintain a predetermined relationship between payload center of gravity and solar pressure force center, thus minimizing momentum buildup, and further including biaxial gimbal drives positioned proximate the instrument payload to provide rotation capability about both an elevation axis and an instrument boresight axis; and
an attitude control system associated with the platform providing rotational motion control about the solar axis that extends from the sun, through the sunshield, to the instrument payload;
the boom having a natural frequency below a frequency of dynamic noise such that the boom minimizes transmission of dynamic noise between the instrument payload and the observatory platform;
the positioning boom further including a plurality of piezoelectric patches disposed thereupon to provide active damping, where stresses along the boom caused by flexing are transmitted to a proximate first piezoelectric sensor that is an element of one of the plurality of piezoelectric patches, and a corresponding damping actuator that is an element of the same piezoelectric patch of which the first piezoelectric sensor is an element provides a force acting on the boom in a direction substantially opposite to a direction of flexing sensed by the first piezoelectric sensor.

* * * * *